US007508401B1

(12) United States Patent
McWalter et al.

(10) Patent No.: US 7,508,401 B1
(45) Date of Patent: Mar. 24, 2009

(54) DRAW MANAGER

(75) Inventors: William Finlay McWalter, Stirling (GB); Vladimir K. Beliaev, Moscow (RU)

(73) Assignee: Sun Microsystems, Inc., Santa Clara, CA (US)

( * ) Notice: Subject to any disclaimer, the term of this patent is extended or adjusted under 35 U.S.C. 154(b) by 580 days.

(21) Appl. No.: 10/805,091

(22) Filed: Mar. 19, 2004

(51) Int. Cl.
*G09G 5/14* (2006.01)
*G09G 5/377* (2006.01)

(52) U.S. Cl. ...................................................... 345/634

(58) Field of Classification Search ................. 345/629, 345/634, 637, 501, 502, 505; 715/778; 725/49, 725/59
See application file for complete search history.

(56) References Cited

U.S. PATENT DOCUMENTS 4,550,386 A * 10/1985 Hirosawa et al. ............ 345/505
5,900,916 A * 5/1999 Pauley .......................... 725/59
5,977,990 A * 11/1999 Kowalski ..................... 345/505
6,957,395 B1 * 10/2005 Jobs et al. .................... 715/765
2003/0006892 A1 * 1/2003 Church ....................... 345/778
2003/0189597 A1 * 10/2003 Anderson et al. ........... 345/778

* cited by examiner

*Primary Examiner*—Jeffrey A. Brier
(74) *Attorney, Agent, or Firm*—Martine Penilla & Gencarella, LLP

(57) ABSTRACT

A system for displaying a user interface for a telematics client is provided. The system includes a display panel configured to display image data and a graphics processor in communication with the display panel. A draw manager in communication with the graphics card is included. An application buffer in communication with the draw manager is provided. The application buffer configured to receive the image data from an application. The application buffer is further configured to transmit the image data to the draw manager at a first rate. The draw manager is configured to determine a rate of updating an object of the display image through manipulation of the image data received from the application buffer. A draw manager and method for providing efficient updates for a display screen associated with a telematics system are included.

9 Claims, 10 Drawing Sheets

Fig. 1 *(prior art)*

DRAW MANAGER

CROSS REFERENCE TO RELATED APPLICATIONS

This application is related to (1) U.S. patent application Ser. No. 10/104,267 filed Mar. 22, 2002, and entitled "Adaptive Connection Routing Over Multiple Communication Channels," (2) U.S. patent application Ser. No. 10/104,245 filed Mar. 22, 2002, and entitled "Abstract User Interface Manager with Prioritization," and (3) U.S. patent application Ser. No. 10/805,065 filed on the same day as the instant application, and entitled "Method and Apparatus for User Interface Manager," each of which are incorporated herein by reference in their entirety for all purposes.

BACKGROUND OF THE INVENTION

1. Field of the Invention

This invention relates generally to computing devices and in particular devices that allow one application to be displayed at a time.

2. Description of the Related Art

Networked devices now encompass appliances, cars, consumer electronic devices and many other portable devices. These devices typically are limited in resources such as memory, computing power, etc. In one aspect, the display panels and scheme for presenting data on the display panels are limited as compared to a desktop environment. One particular area where this aspect is relevant concerns the telematics environment.

The electronic content and sophistication of automotive designs has grown markedly. Microprocessors are prevalent in a growing array of automotive entertainment safety and control functions. Consequently, this electronic content is playing an increasing role in the sales and revenues of the automakers. The features provided by the electronic content include audio systems, vehicle stability control, driver activated power train controls, adaptive cruise control, route mapping, collision warning systems, etc. The significant increase of the electronic content of land based vehicles has concomitantly occurred with the explosive growth of the Internet and the associated data driven applications supplied through mobile applications.

Telematics, a broad term that refers to vehicle-based communication systems and information services, promises to combine vehicle safety, entertainment and convenience features through wireless access to distributed networks, such as the Internet. Telematics offers the promise to move away from the hardware-centric model from audio and vehicle control systems that are built into devices that are custom designed for each vehicle, to infotainment delivered by plug-and-play hardware whose functionality can be upgraded through software loads or simple module replacement. Furthermore, new revenue streams will be opened up to automobile manufacturers and service providers through the products and services made available through telematics.

Since these infotainment systems integrate entertainment and information within a common envelope, the systems need to be highly integrated, open and configurable. However, the electronic systems currently on the market are custom designed for the make, model, year and world region in which the vehicle is sold. Additionally, the electronic systems being used today are linked by proprietary busses having severely limited bandwidth that are inadequate for data-intensive services combining information entertainment and safety. The presentation of data on these systems includes a simple display screen in communication with a computing device, where the computing device displays an application in the entire viewable area of the screen at a time.

Because of the nature of displaying the data, and the plurality of applications that may be desired by a telematics user, e.g., a navigation system, a web browser, email application, and any other suitable application, there must be a relatively simple scheme for navigating between applications. That is, unlike the disk operating system (DOS) where the user has to quit an application to get back to the DOS environment, it is desired to bring the system through the application. FIG. 1 illustrates a simplified schematic diagram of a windows environment. Here, display screen 10 illustrates two windowed applications, i.e., word processing application 12 and email application 14. As is generally known, when word processing application 12 is active, email application 14 has been notified that the email application has lost focus, and vice versa. However, in the resource limited environment of telematics or any other suitable resource limited networked device the amount of programming and the code size for this feature becomes burdensome.

In addition, for current systems, applications themselves are responsible for determining how and when drawing takes place. However, where applications do not have full control of the user interface which is true in the limited resource environment mentioned above, the applications may be responsible for sending data to the drawing code to update the view. These tasks tend to be burdensome on the application as the system is unable to write to the screen at a fast enough rate.

In view of the forgoing, there is a need for a system and method to alleviate the burden on the application for sending data to the drawing code directly when the application does not have full control of the user interface.

SUMMARY OF THE INVENTION

Broadly speaking, the present invention fills these needs by providing a draw manager configured to receive update data from the applications for updating a view and the draw manager then updates the view. It should be appreciated that the present invention can be implemented in numerous ways, including as an apparatus, a system, a device, or a method. Several inventive embodiments of the present invention are described below.

In one embodiment, a system for displaying a user interface for a telematics client is provided. The system includes a display panel configured to display image data and a graphics processor in communication with the display panel. A draw manager in communication with the graphics card is included. An application buffer in communication with the draw manager is provided. The application buffer is configured to receive the image data from an application. The application buffer is further configured to transmit the image data to the draw manager at a first rate. The draw manager is configured to determine a rate of updating an object of the display image through manipulation of the image data received from the application buffer.

In another embodiment, a draw manager configured to optimize updating of a display being presented is provided. The draw manager includes a memory module for receiving image data from an application buffer. Logic for transmitting the image data for display and logic for determining an update time period for the image data being displayed are included. Logic for transmitting updated image data for display according to the update time period is provided.

In yet another embodiment, a method for providing efficient updates for a display screen associated with a telematics system is provided. The method initiates with writing data to an application buffer at a first rate and then writing the data from the application buffer to a draw manager. A second rate for updating a display presented on the display screen is determined. The second rate being a less frequent rate than the first rate. Updated image data is then defined. The defining of the updated image data includes performing an interpolation between values associated with most recent image data of the draw manager and values associated with previous image data of the draw manager. The display presented on the display screen is then updated with the updated image data.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION OF THE PREFERRED EMBODIMENTS

Figure 1:
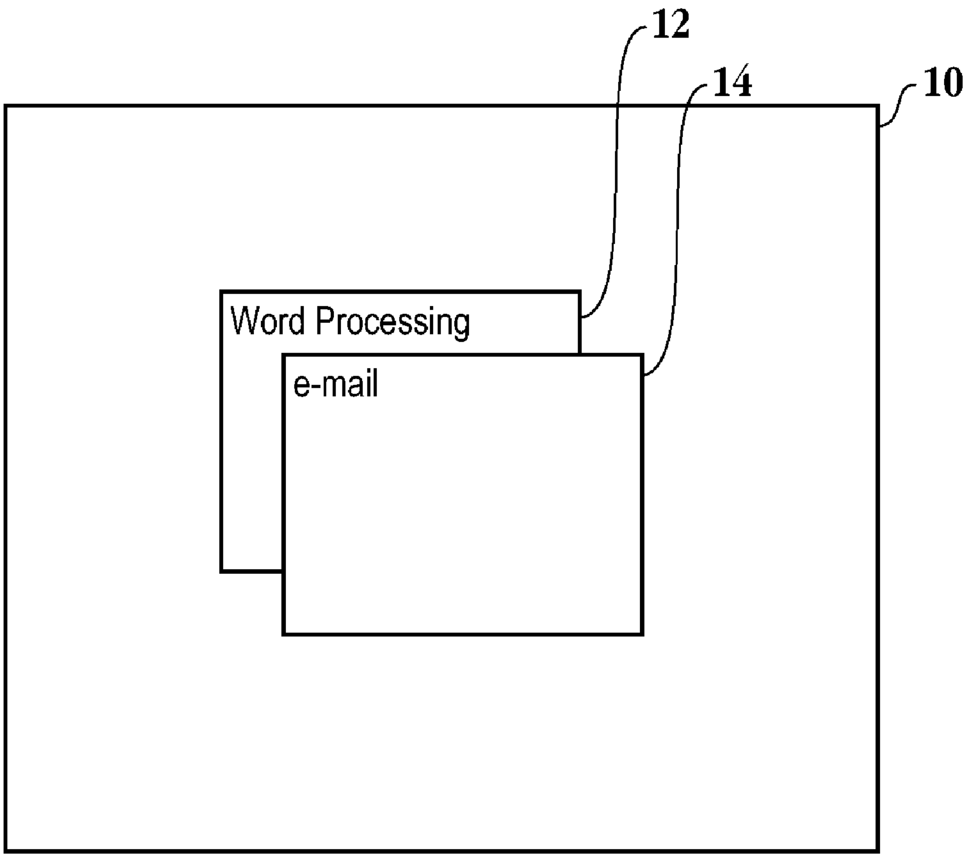
FIG. 1 illustrates a simplified schematic diagram of a windows environment.

An invention is disclosed for a draw manager that acts as a middleman in that the draw manager receives updates from the application and then updates the view being presented at a rate suitable for the draw manager. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

The embodiments of the invention described herein provide a system and method where a draw manager does the updating of the view, thereby eliminating the need to fetch data. As will be explained in more detail below, the client side of the telematics system includes a telematics control unit (TCU) that ties into the vehicle systems. In one embodiment, the TCU is associated with a user interface (UI) that provides a user with access to control options. It should be appreciated that the user can interact with the TCU through speech recognition, a mouse type device, touch pad or some other suitable mechanism which has a minimal impact on the unique human-machine interface of an automobile while satisfying the small footprint requirement of an embedded system. Of course, a passenger of the vehicle is not limited by the restrictions on the driver with respect to the interaction with the UI.

The TCU can tie into any of the control systems, safety systems, entertainment systems, information systems, etc., of the vehicle. It will be apparent to one skilled in the art that the client side stack of the TCU is utilized to access a vehicle interface component for accessing in-vehicle devices, such as the speedometer, revolutions per minute (rpm) indicator, oil pressure, tire pressure, global positioning system (GPS), door locks, etc. Thus, client side applications sitting in the TCU will allow for the functionality with respect to the vehicle systems as well as infotainment applications. While the embodiments discussed herein are illustrated in terms of a telematics environment, one skilled in the art will appreciate that the embodiments may be extended to any suitable device having limited resources and a display configuration where one application is displayed at a time.

In one embodiment, the telematics system deploys Java technology. It should be appreciated that Java technology's platform-independence and superior security model provide a cross-platform solution for the heterogeneous systems of a vehicle while maintaining a security architecture protecting against viruses and unauthorized access. In addition, the write once, run anywhere nature of the Java language allows content providers to write their applications for a class of device. Thus, the content or service provider is insulated against the myriad of car platforms while vehicle manufacturers are protected against hacker threats. The Java language encourages object oriented design and its automatic memory management prevents most common sources of programming errors, i.e., memory leaks and corruption. In addition, Java application program interfaces (APIs) are available to support telematics mediums, such as speech recognition through Java Speech API (JSAPI), media delivery through Java Media Framework (JMF) and wireless telephony through Wireless telephony communications APIs (WTCA), etc.

Figure 2:
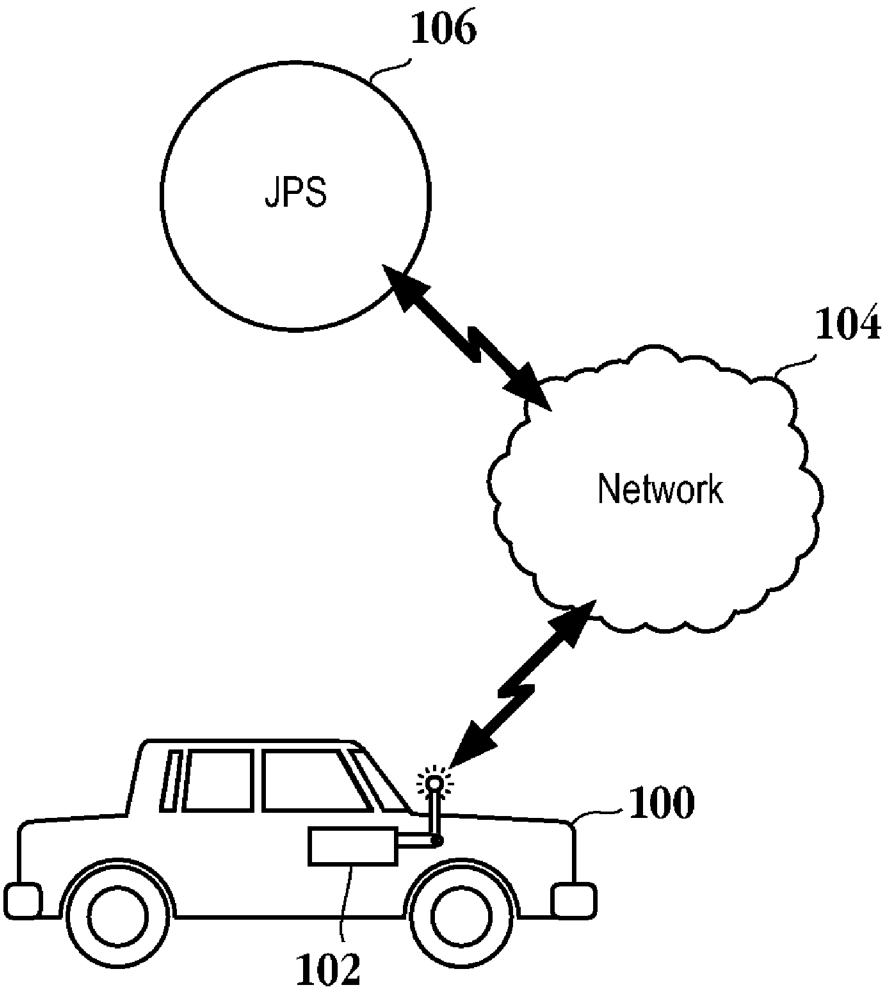
FIG. 2 is a high level schematic overview of an automotive telematics system in accordance with one embodiment of the invention.

FIG. 2 is a high level schematic overview of an automotive telematics system in accordance with one embodiment of the invention. A client/server architecture relying on standards and principles of modular design allows for functionality of the telematics system to be delivered to the customer through wireless access. The server side includes Java provisioning server (JPS) 106 in communication with network 104. For a detailed description of JPS 106 please refer to U.S. patent application Ser. No. 10/104,267 which has been incorporated herein by reference in its entirety for all purposes. The client side includes telematics control unit (TCU) 102 contained within the body of land based vehicle 100. TCU 102 is enabled to communicate with network 104 through wireless access. Of course, network 104 can be any distributed network such as the Internet and the wireless access protocol (WAP) can be any suitable protocol for providing sufficient bandwidth for TCU 102 to communicate with the network. It should be appreciated that the client/server architecture of FIG. 2 allows for the evolution from hard wired, self contained components to platform based offerings relying on software and upgrades. Thus, a service provider controlling JPS 106 can deliver an unbundled, open end-to-end solution enabling plug and play applications. For example, the service can be a tier-based service similar to home satellite and cable services. It will be apparent to one skilled in the art that an open platform, such as frameworks based on Java technology, enables a developer to create executable applications without regard to the underlying hardware or operating system. While FIG. 2 illustrates an automobile, it should be appreciated that TCU 102 can be incorporated in any vehicle or mode of transportation whether it is land based or non-land based. For example, a boat, a plane, a helicopter, etc. can incorporate TCU 102.

Figure 3:
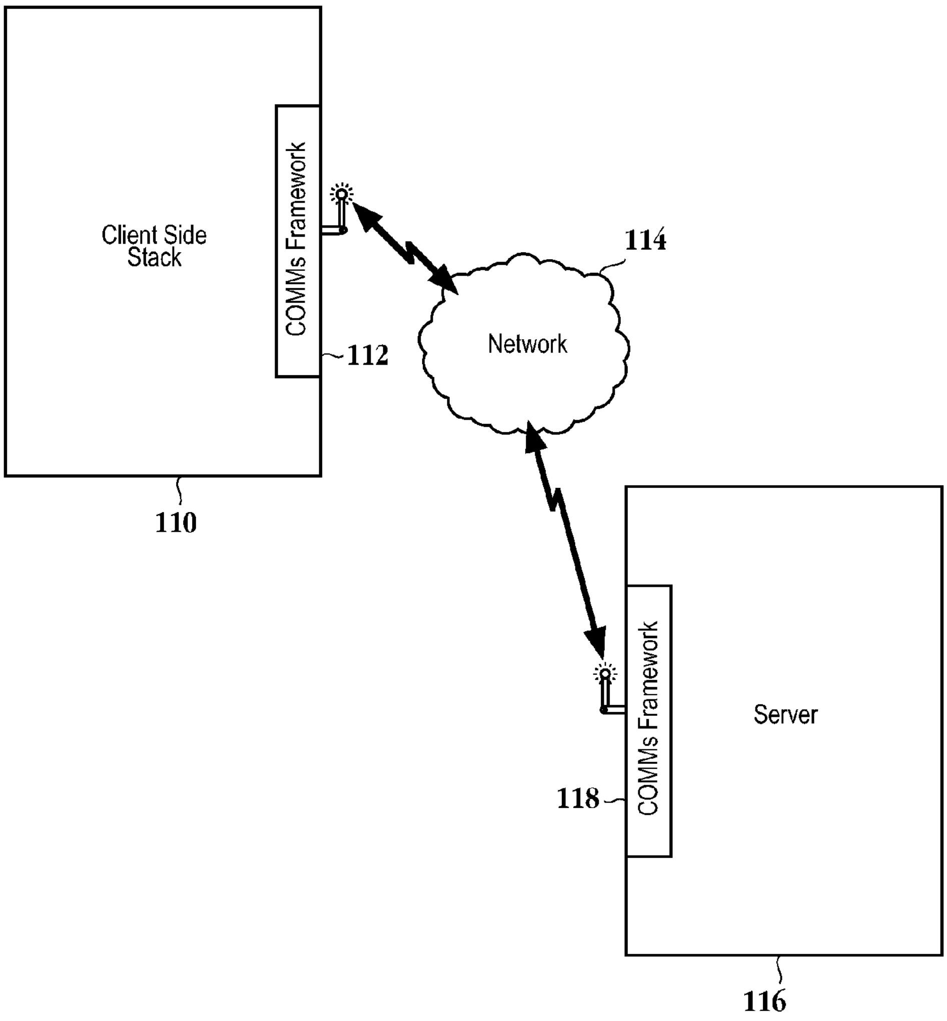
FIG. 3 is a schematic diagram of a telematics client communicating through a wireless network with a telematics server in accordance with one embodiment of the invention.

FIG. 3 is a schematic diagram of a telematics client communicating through a wireless network with a telematics server in accordance with one embodiment of the invention. Client side stack 110 includes the necessary layers for a client application, also referred to as a manager or a carlet, to be executed to provide functionality. As will be explained further below, the carlet has access to each layer of the client side stack 110. Included in client side stack 110 is client communication framework 112. Client communication framework 112 enables communication between the client side stack 110 and an application on server 116 through network 114. It should be appreciated that server 116 is not limited to a wireless connection. For example, server 116 can be hardwired into network 114. One skilled in the art will appreciate that where server 116 communicates through a wireless connection with network 114, the communication proceeds through server communication framework 118. With respect to an embodiment where server 116 is hardwired to network 114, the server can communicate with network 114 through a network portal (e.g. the Internet) rather than server communication framework 118. Additionally, network 114 can be any suitable distributed network, such as the Internet, a local area network (LAN), metropolitan area network (MAN), wide area network (WAN), etc.

Figure 4:
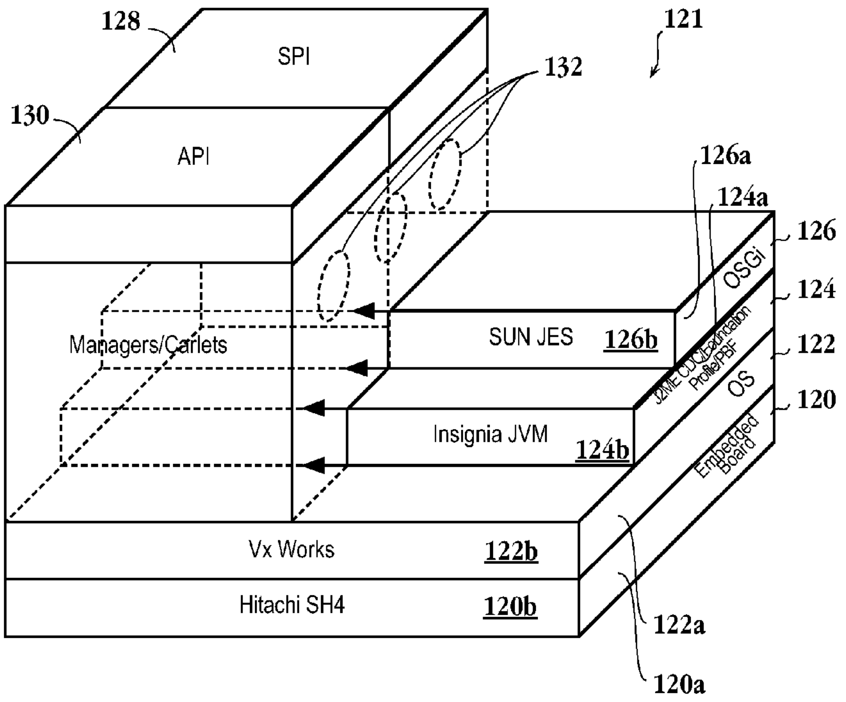
FIG. 4 is a three dimensional pictorial representation of a telematics client reference implementation of the client side stack of FIG. 3 in accordance with one embodiment of the invention.

FIG. 4 is a three dimensional pictorial representation of a telematics client implementation of the client side stack of FIG. 3 in accordance with one embodiment of the invention. Client side implementation 121 includes hardware layer 120 of the client includes an embedded board containing a telematics control unit (TCU). As mentioned with reference to FIG. 3, the TCU is incorporated into a land based vehicle. In one embodiment, the TCU is in communication with the electronic components of a vehicle through a vehicle bus or other communication means. These components include the measurement of vehicle operating and safety parameters, such as tire pressure, speed, oil pressure, engine temperature, etc., as well as information and entertainment components, such as audio system settings, internet access, email, news, environmental control within the cabin of the vehicle, seat positions, etc. One skilled in the art will appreciate that the telematics control unit is capable of integrating the functionality of various handheld information and entertainment (infotainment) devices, such as mobile phones, personal digital assistants (PDA), MP3 players, etc.

Still referring to FIG. 4, operating system layer 122 sits above hardware layer 120. Java virtual machine (JVM) layer 124 sits on top of operating system (OS) layer 122 and open services gateway initiative (OSGI) layer 126 sits on top of the JVM layer. It should be appreciated that the standard for JVM layer 124 includes Java 2 Platform Micro Edition (J2ME), Connected Device Configuration (CDC), Foundation Profile, Personal Profile or Personal Basis Profile. One skilled in the art will appreciate that J2ME Foundation Profile is a set of APIs meant for applications running on small devices that have some type of network connection, while J2ME CDC Personal Profile or Personal Basis Profile provides the J2ME CDC environment for those devices with a need for a high degree of Internet connectivity and web fidelity. The standards for each of the layers of the stack are provided on the right side of client side implementation 121. In particular, OSGI **126*a*, J2ME CDC 124*a*, OS 122*a*, and embedded board 120*a* are standards and to the left of the standards are examples of actual products that implement the standards. For example, OSGI 126*a* standard is implemented by Sun's Java Embedded Server (JES) 2.1 126*b*, J2ME 124*a* standard is implemented by Insignia's Virtual Machine 124*b*, OS 122*a* is implemented by Wind River's V×Works real time operating system 122*b*, and embedded board 120*a* is an embedded personal computer based board such as Hitachi's SH4 120*b***. It should be appreciated that the actual products are exemplary only and not meant to be limiting as any suitable product implementing the standards can be utilized.

Carlets 132 of FIG. 4, have access to each layer above and including OS layer 122. Application program interface (API) layer 130 is the layer that carlets use to communicate with the application on the server side. Service provider interface (SPI) layer 128 is a private interface that managers have among each other. One skilled in the art will appreciate that OSGI layer 126 provides a framework upon which applications can run. Additional functionality over and above the JVM, such as lifecycle management is provided by OSGI layer 126. It should be appreciated that the open services gateway initiative is a cross industry working group defining a set of open APIs for a service gateway for a telematics systems. These APIs consist of a set of core framework APIs. In order to deploy services and their implementations OSGI defines a packaging unit called a service bundle. A service bundle is a Java Archive (JAR) file containing a set of service definitions along with their corresponding implementation. Both infrastructure services and carlets are deployed as service bundles. Some of the functionality for arbitrating, controlling and managing devices and resources, e.g., speakers, cell phones, etc., by OSGI layer 126. However, one skilled in the art will appreciate that a separate arbitration service may also be required. As used herein, a carlet is a Java application. For each function or task to be processed on the client side or between the client and server sides, a carlet is invoked to manage the operation. In this manner, carlets can be independently written, tested, and launched for use on a telematics system. By way of example, a carlet can be written to control or monitor the activity of automobile components (e.g., tires, engine oil, wiper activity, steering tightness, maintenance recommendations, air bag control, transmission control, etc.), and to control or monitor applications to be processed by the telematics control unit (TCU) and interacted with using the on-board automobile monitor. As such, specialized carlets can be written to control the audio system, entertainment modules (e.g., such as on-line games or movies), voice recognition, telecommunications, email communications (text and voice driven), etc. Accordingly, the type of carlets that can be written is unlimited. Carlets may be pre-installed or downloaded from a sever. A carlet may or may not have an API which may be invoked by other carlets and it may or it may not have running threads of its own.

Figure 5:
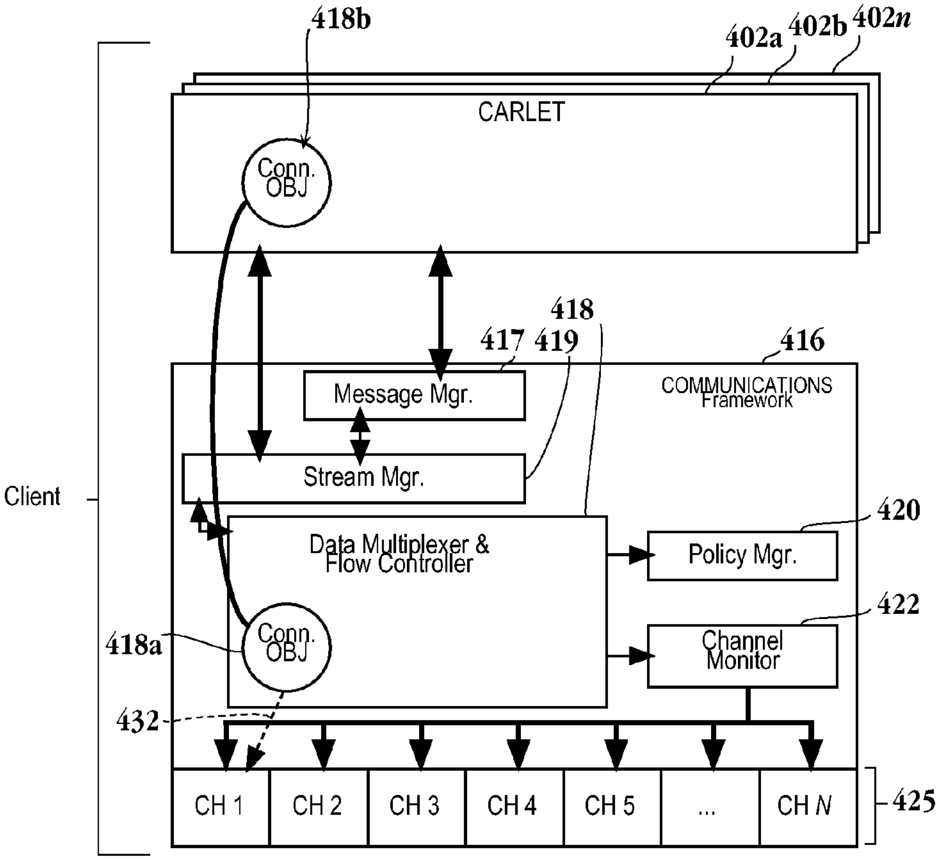
FIG. 5 is a high level schematic diagram of the interaction between a carlet and a communications framework on the client side of a telematics system in accordance with one embodiment of the invention.

FIG. 5 is a high level schematic diagram of the interaction between a carlet and a communications framework on the client side of a telematics system in accordance with one embodiment of the invention. It should be appreciated that the server side has a similar communication framework to establish and enable synchronous communication between the client side (e.g., a telematics control unit on a vehicle) and the server side (e.g., a Java telematics server). The communications framework 416 includes a message manager 417, a stream manager 419, a data multiplexer and flow controller 418, a policy manager 420, a channel monitor 422, and an interface to the various physical channels available to the communications framework of the client side.

Still referring to FIG. 5, when a particular carlet application 402 in a plurality of carlet applications 402*a*-402*n* is requested, the carlet will communicate with the stream manager 419 and request that a connection be established. In response, the stream manager 419 will request a connection object (Conn. OBJ) 418*a* from the data multiplexer and flow controller 415. Once a channel satisfying the request is available, the data multiplexer and flow controller 415 will return a connection object (Conn. OBJ) 418*b* back to the carlet. Thus, a communication link 432 is established between the carlet application 402 via the connection objects 418*a* and 418*b* of the data multiplexer and flow controller 418. In one embodiment, the connection object 418*a* of the data multiplexer and flow controller 418 has the ability to switch between channels 425 that are available to the communications framework 416 of the client side. Here, code contained in the policy manager enables selection of different channels depending upon availability, the type of communication desired, bandwidth requirements for a given data transfer or transfers, payment of a bandwidth fee, subscription level, etc.

Figure 6:
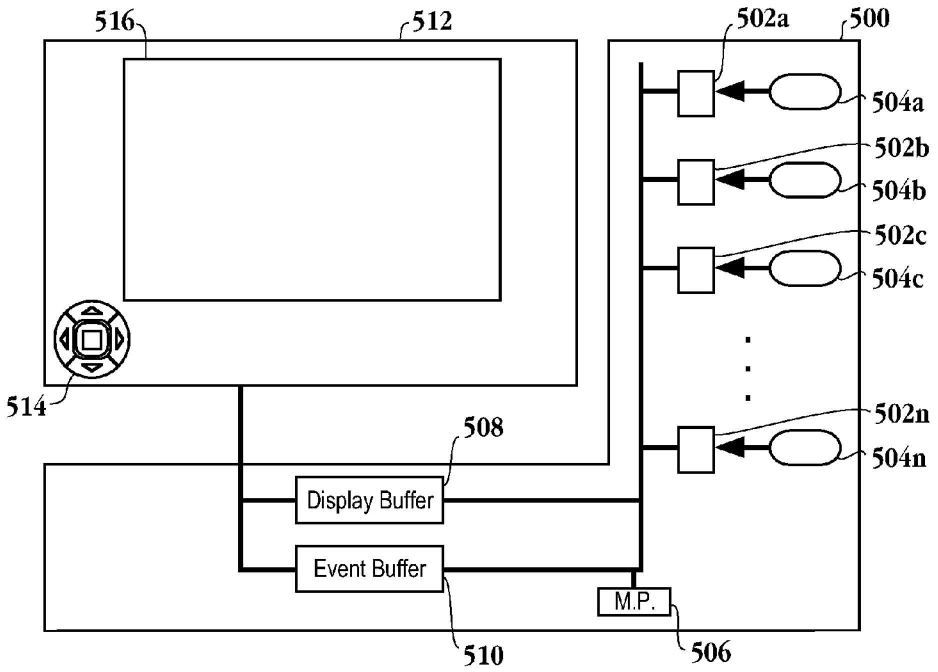
FIG. 6 is a simplified schematic diagram of a system for displaying a user interface for a telematics client in accordance with one embodiment of the invention.

FIG. 6 is a simplified schematic diagram of a system for displaying a user interface for a telematics client in accordance with one embodiment of the invention. The system includes computing device 500 and display panel 512. Computing device 500 includes a plurality of applications 504*a* through 504*n* and corresponding application buffers 502*a* through 502*n*. Display buffer 508 and event buffer 510 are also included in computing device 500. Microprocessor 506 is in communication with each of the application buffers 502*a* through 502*n* as well as display buffer 508 and event buffer 510. Display panel 512 is in communication with computing device 500. Display panel 512 includes a viewable area 516 and navigation switch 514. It should be appreciated that navigation switch 514 may also be referred to as a selector switch.

As the system described above in FIG. 6 may not have windowing, i.e., the application takes over the entire viewable area 516, it is desirable to provide a scheme for switching applications without having to notify an application that it no longer has focus. Here, applications 504*a* through 504*n* do not receive events that indicate the application has gained or lost focus. In essence, each application perceives that a user is interacting with that application. Thus, applications 504*a* through 504*n* continually write to the corresponding application buffer 502*a* through 502*n* even if the corresponding application does not have focus. That is, even though one of the applications takes over the entire viewable area 516 of display panel 512, the remaining applications are still running in the background. Therefore, a user may select an application to be presented on display screen 512 through navigation button 514. Navigation button 514 enables a user to bring the system through the application, as opposed to previous environments where only one application was displayed at a time, i.e., non-windowing environments. It should be appreciated that the embodiments described herein provide for a windowing environment without windows. Thus, where a device is constrained to displaying one application at a time, an entity outside of the application determines which application is given focus. It will be apparent to one skilled in the art that an application is given focus when the application is being actively displayed and interacted with.

Figure 7:
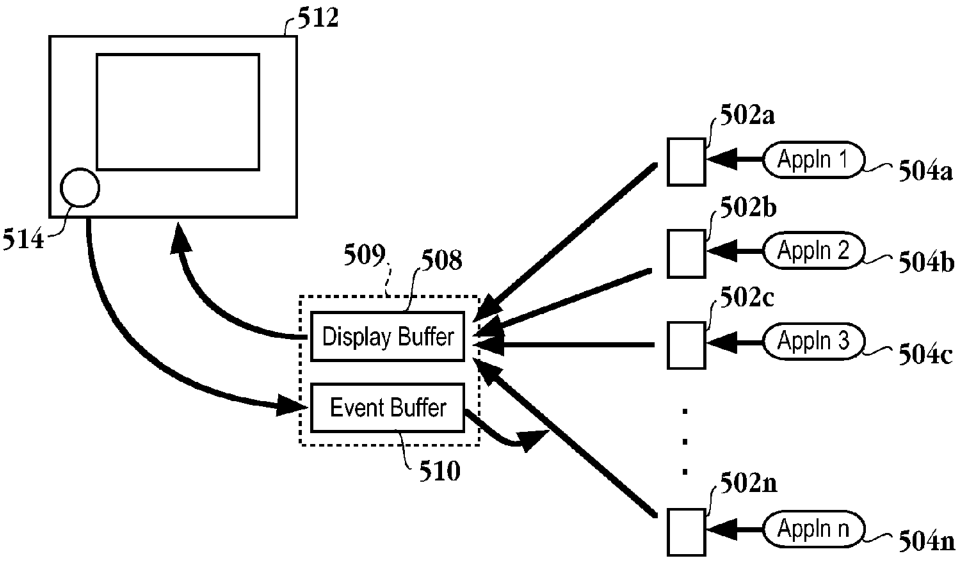
FIG. 7 is an alternative embodiment representing the system described in FIG. 6.

FIG. 7 is an alternative embodiment representing the system described in FIG. 6. Here, application buffers 502*a* through 502*n* are continually writing to display buffer 508. As discussed above, the corresponding applications 504*a* through 504*n* provide the data for the user interface which is ultimately displayed on display screen 512. It should be appreciated that applications 504*a* through 504*n* may be any suitable application, such as, for example, a word processing application, an e-mail application, a spreadsheet application, a navigation application, a web browser, etc. Through event buffer 510, it is decided which application and corresponding application data is displayed on display screen 512. That is, event buffer 510 acts as a switch which may cut off data from certain application buffers, thereby defining the data which is eventually displayed on display screen 512. For example, event buffer 510 may send a signal which selects data from application 504*n* which is provided through application buffer 502*n*. Thus, the data from application buffers 502*a* through 502*c* are cut off as decided through the data associated with event buffer 510. It should be appreciated that the switching provided through event buffer 510 is initiated through navigation button 514.

Thus, the system decides from which buffer data is taken and is sent to the display screen based on what a user wants to interact with. One skilled in the art will appreciate that the embodiments described herein enables simplified programming, which provides for a robust environment. In addition, the embodiments enable reduced code size also referred to as code compaction. These features are highly desirable in a telematics-type environment where resources tend to be limited. Furthermore, in a system where multiple applications run on a single device where the single device is not capable of presenting a window environment, the display buffer represents a drawable area for each application to write to. As each application is not aware of whether the application has focus, each of the applications constantly write to a corresponding application buffer. Thus, when an application is given focus, the system takes data from display buffer 508 and writes it to the drawable area for the display screen. It should be appreciated that event buffer 510 and display buffer 508, together with associated code, define a user interface manager. The user interface manager may be referred to as a draw manager, explained in more detail below.

Figure 8:
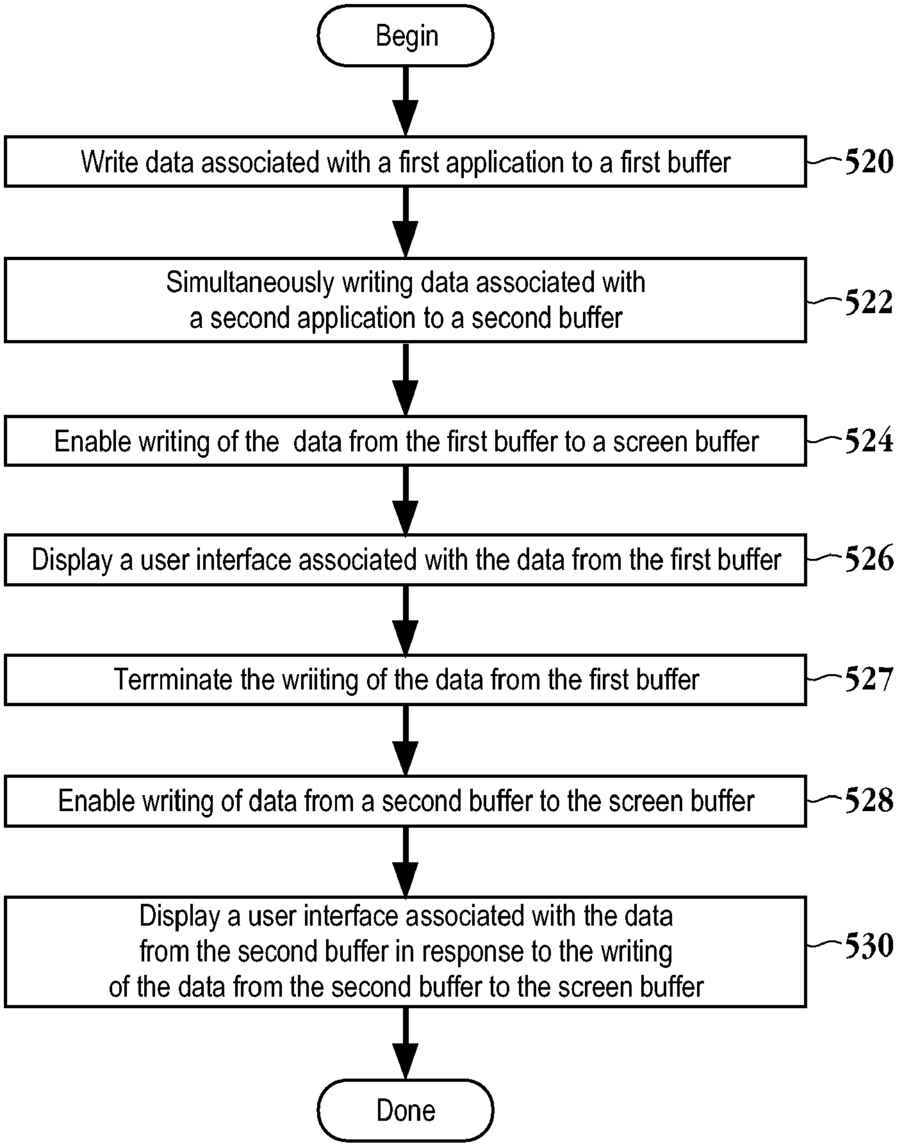
FIG. 8 is a flow chart diagram illustrating the method operations for providing a windowing environment in a user interface allowing display of a single application occupying an entire viewable area of the user interface in accordance with one embodiment of the invention.

FIG. 8 is a flow chart diagram illustrating the method operations for providing a windowing environment in a user interface allowing display of a single application occupying an entire viewable area of the user interface in accordance with one embodiment of the invention. The method initiates with operation 520 where data associated with a first application is written to a first buffer. The method then moves to operation 522 where data associated with a second application is written to a second buffer. It should be appreciated that operations 520 and 522 may occur simultaneously. Here, with reference to FIGS. 6 and 7 multiple applications are simultaneously writing to corresponding buffers. The method of FIG. 8 then proceeds to operation 524 where writing the data from the first buffer to a screen buffer is enabled. For example, with reference to FIGS. 6 and 7, the event buffer is used to enable or select which data stream to allow to be written to the display buffer. It should be appreciated that the terms "screen buffer" and "display buffer" are interchangeable as used herein. Of course, the selection of the first buffer data to be written to the screen buffer may be initiated through a selector switch associated with the display.

The method of FIG. 8 then advances to operation 526, where a user interface associated with the data from the first buffer is displayed. Here, the user interface occupies the entire viewable area of the display. The method then moves to operation 527 where the writing of the data from the first buffer to the screen buffer is terminated. Here, the termination of the writing of the data from the first buffer to the screen buffer may be initiated through a user deciding to switch applications to be displayed through the selector switch. The method then proceeds to operation 528 where the writing of the data from a second buffer to the screen buffer is enabled. Here, the selector switch triggers a signal through the event buffer which cuts off data from the first application buffer and enables data from the second application buffer to be written to the screen buffer. As mentioned above, even though the writing of the data from the first buffer to the screen buffer has been terminated, the application associated with the first buffer continues to write data to the application buffer and does not become aware that the application associated with the first buffer has lost focus. The method then advances to operation 530 where a user interface associated with the data from the second buffer is displayed in response to the writing of the data from the second buffer to the screen buffer. Thus, the embodiments described above include a system with interim buffers for each application. The interim buffers are continually written to by the corresponding applications so that the application does not know if it the application has been de-selected, i.e., has lost focus. The interim buffers then communicate the data to the screen buffer wherein an event buffer is used to provide a signal to select one of the streams of data from the interim buffers in order to be written to a drawable area on a display screen.

Figure 9:
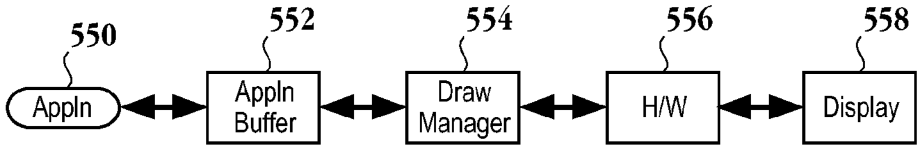
FIG. 9 is a simplified schematic diagram illustrating a system for displaying a user interface in which a draw manager is responsible for updating a display rather than an application in accordance with one embodiment of the invention.

FIG. 9 is a simplified schematic diagram illustrating a system for displaying a user interface in which a draw manager is responsible for updating a display rather than an application in accordance with one embodiment of the invention. Here, application 550 writes to application buffer 552, which in turn transmits data to draw manager 554. It should be appreciated that draw manager 554 includes memory and code. In one embodiment, draw manager 554 includes a display buffer such as the display buffer described with reference to FIGS. 6 and 7. Draw manager 554 is in communication with hardware 556. One skilled in the art will appreciate that hardware 556 may include a graphics processor. Hardware 556 is in communication with display screen 558. As can be seen through FIG. 9, application 550 does not send data to the drawing code directly. Application 550 is configured to update the draw manager at a certain rate. The draw manager then takes on the task of updating the view on display screen 558. For example, if part of the view being displayed on display screen 558 is obscured, then un-obscured, draw manager 554 performs the re-draw and not the application 550. As a result of the application writing as often as the application desires, and the system writing as often as the system desires, the system performs the optimization. Thus, draw manager 554 may be configured to be optimized depending on the particular operating system and hardware 556 incorporated in the computing device in accordance with one embodiment of the invention.

Figure 10:
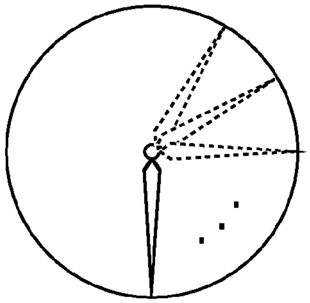
FIG. 10 is a simplified schematic diagram of an object being displayed on a display screen in accordance with one embodiment of the invention.

FIG. 10 is a simplified schematic diagram of an object being displayed on a display screen in accordance with one embodiment of the invention. Here, an RPM indicator is being displayed on the display screen, such as display screen 558 of FIG. 9. In one embodiment, in order to provide a smooth transition as the RPM indicator needle changes its position in response to an engine revving, an interpolation may be performed. Here, the draw manager of FIG. 9 will perform the interpolation based upon current and previous data received from the application. It should be appreciated that it is faster to do the interpolation rather than fetching data from the application buffer.

Figure 11:
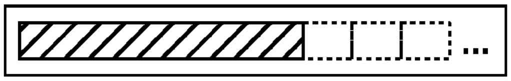
FIG. 11 is a simplified schematic diagram of status bar which further exemplifies the advantages of having a draw manager as a middle man in one embodiment of the invention.

FIG. 11 is a simplified schematic diagram of status bar which further exemplifies the advantages of having a draw manager as a middle man in one embodiment of the invention. Here, the status bar is constantly being updated as some process is progressing. Thus, the draw manager is configured to optimize the display based upon the hardware and operating system for the computing environment in which the draw manager resides.

Figure 12:
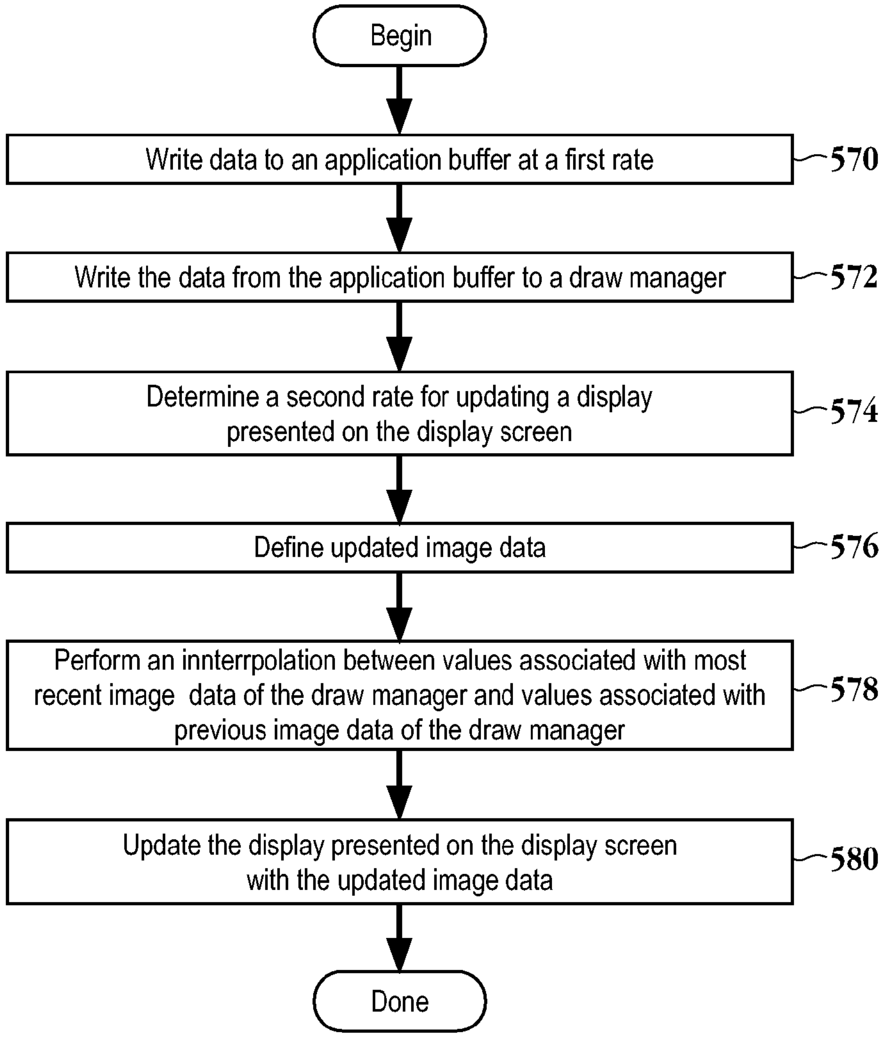
FIG. 12 is a flow chart diagram illustrating the method operations for providing efficient updates for a display screen associated with a telematics system in accordance with one embodiment of the invention.

FIG. 12 is a flow chart diagram illustrating the method operations for providing efficient updates for a display screen associated with a telematics system in accordance with one embodiment of the invention. The method initiates with operation 570 where data is written to an application buffer at a first rate. The data from the application buffer is then written to a draw manager in operation 572. In operation 574 a second rate for updating a display presented on the display screen is determined. Here, the second rate takes into consideration the operating system and the hardware as described above. The method then proceeds to operation 576 where updated image data is defined. Here, an interpolation between values associated with the most recent image data of the draw manager and values associated with previous image of the draw manager may be performed in order to provide an optimized update for the image data. For example, as mentioned above with reference to the RPM indicator and the status bar, the draw manager updates the display at a rate that is different than the rate at which data is written to an application buffer. The method then advances to operation 580 where the display presented on the display screen is updated with the updated image data as determined in operation 576 and operation 578.

In summary, the embodiments provide for a windowing environment where a device is constrained to display one application at a time. Furthermore, the implementation disclosed herein enables the windowing environment with a reduced code size and simplified programming, which is optimal for the limited resource environment. It should be appreciated that these objectives are achieved through the use of the interim application buffers associated with each application that enable the application to continually write data to the corresponding application buffer. Thus, the logic associated with the need to notify applications when the application has gained or lost focus is unnecessary. In addition, a draw manager is provided to act as a middleman to alleviate some of the burden on the application. That is the application can constantly write to a corresponding application buffer, while the draw manager performs the task of writing information to the screen. In this manner, the application writes to the application buffer as often as the application wants, while the system, or draw manager, writes to update the display as often as desired. Thus, the draw manager enables the decoupling of the application from the drawing code.

In one embodiment, the programming language used for programming the functionality described herein is Java. Unlike most programming languages, in which a program is compiled into machine-dependent, executable program code, Java classes are compiled into machine independent byte-code class files which are executed by a machine-dependent virtual machine. The virtual machine provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

More specifically, Java is a programming language designed to generate applications that can run on all hardware platforms, small, medium and large, without modification. Developed by SUN, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "bytecode". The bytecode is then converted (interpreted) into machine code at runtime. Upon finding a Java applet, the Web browser invokes a Java interpreter (Java Virtual Machine), which translates the bytecode into machine code and runs it. Thus, Java programs are not dependent on any specific hardware and will run in any computer with the Java Virtual Machine software. On the server side, Java programs can also be compiled into machine language for faster performance. However, a compiled Java program loses hardware independence as a result.

Although the present invention is described based on the Java programming language, other programming languages may be used to implement the embodiments of the present invention, such as other object oriented programming languages. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software application can be written using an object-oriented programming language whereby the program's functionality is implemented using objects. Examples of object-oriented programming languages include C++ as well as Java.

Furthermore the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the TCU discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system to display a user interface for a telematics client incorporated in a vehicle, comprising:

a display panel configured to display image data of the user interface, wherein the user interface defined to display a data that is being received from an application executing in a telematics server, the data being received from the application executing in the telematics server via a carlet application running in the telematics client and the telematics client incorporated in the vehicle is in communication with the application through a wireless network and the display panel displays the image data of the user interface associated with only one carlet application at a time;

a graphics processor in communication with the display panel;

a draw manager in communication with the graphics processor to manage updating of the display panel and to relieve the carlet application from managing the updating of the display panel; and an application buffer, located at the telematics client, in communication with the draw manager, the application buffer configured to receive the image data from the carlet application and the carlet application configured to receive the data from the application executing in the telematics server, the application buffer further configured to transmit the image data to the draw manager at a first rate, wherein the draw manager is configured to determine a rate of updating an object of the display image through an interpolation between values associated with most recent image data received from the application buffer and values associated with previous image data in the draw manager.

2. The system of claim 1, wherein the interpolation is performed by interpolation of sequential image data.

3. The system of claim 1, wherein the draw manager includes a memory module and draw manager logic.

4. The system of claim 1, wherein the first rate is faster than the rate of updating an object of the display image.

5. The system of claim 1, wherein the draw manager is configured to selectively optimize the rate of updating the object based upon an operating system type and the graphics processor.

6. The system of claim 1, further comprising:

a user interface manager enabling a windowing environment for the application, where the application occupies an entire viewable area of a display screen without alerting other applications whether the other applications have lost or gained focus.

7. The system of claim 6, wherein the user interface manager includes a plurality of logic modules, the plurality of logic modules include, a logic module to write application data from a plurality of applications to corresponding application buffers;

a logic module to enable a first one of a plurality of application buffers to write data to the draw manger;

a logic module to display user interface data within the entire viewable area of the display panel from the draw manager; and a logic module to switch from a first one of the plurality of application buffers writing data to the draw manager to a second one of the plurality of application buffers while each of the plurality of applications continues to write application data to corresponding application buffers.

8. The system of claim 7, wherein each of the plurality of logic modules is one of or a combination of hardware and software.

9. The system as recited in claim 1, further including a vehicle bus to enable communication between the telematics client and electronic components of the vehicle.

* * * * *